March 14, 1939. V. C. DE YBARRONDO 2,150,543
MOVABLE MOTION PICTURE SCREEN AND APPURTENANCES THERETO
Filed Jan. 21, 1936 2 Sheets-Sheet 2
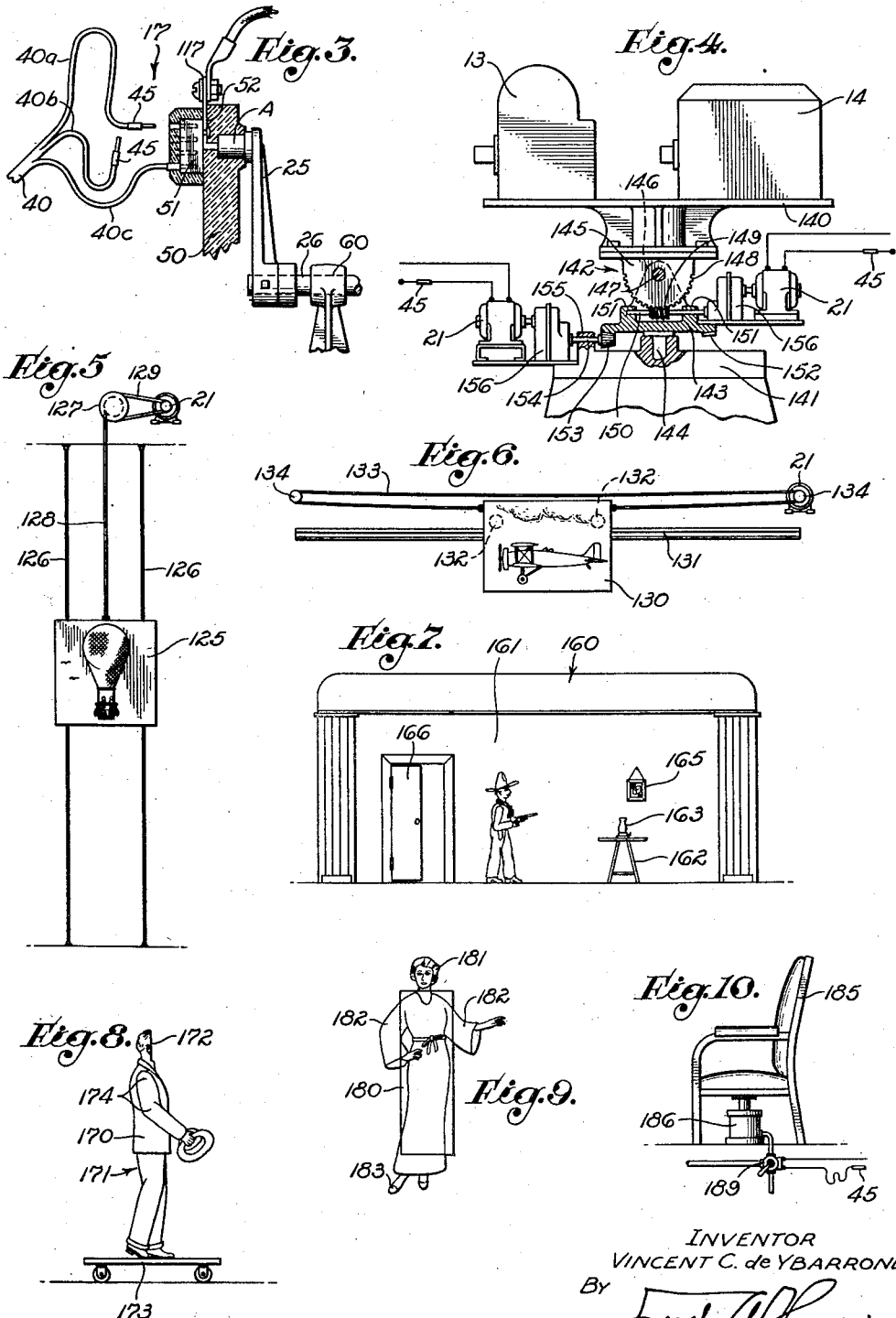
INVENTOR
VINCENT C. de YBARRONDO
By
ATTORNEY Patented Mar. 14, 1939

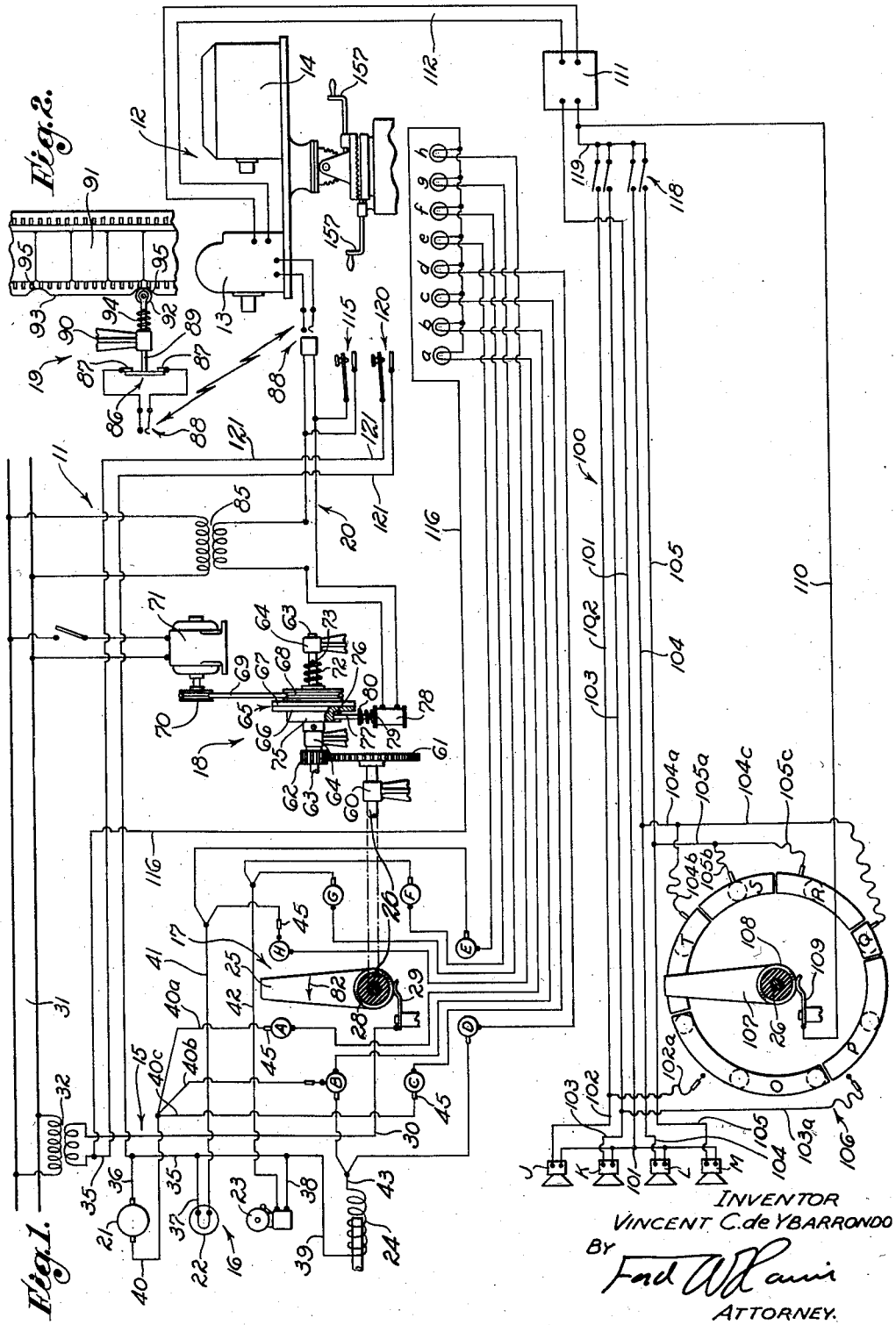

2,150,543

UNITED STATES PATENT OFFICE 2,150,543

MOVABLE MOTION PICTURE SCREEN AND APPURTENANCES THERETO

Vincent C. de Ybarrondo, Los Angeles, Calif., assignor to Patco, Inc., Los Angeles, Calif., a corporation of California Application January 21, 1936, Serial No. 60,038

10 Claims. (Cl. 272—10)

My invention relates in general to the art of producing and displaying motion pictures, and in particular relates to the display of composite scenes comprising both physical objects and projected images.

It is a primary object of the invention to provide in combination with a motion picture projector, apparatus which operates to add more realistic effects to the scenes portrayed and to the sound effects accompanying the scene than is possible by the projection of ordinary sound films on the ordinary type of motion picture screen.

It is an object of the invention to provide a greater illusory effect of movement of an object in a projected scene by providing a movable screen which moves relative to the audience viewing the scene in a direction and manner which agrees with the portrayed action in the projected image.

It is another object of the invention to provide in connection with a movable motion picture screen, an apparatus including a directional projector which is movable to project an image on the screen, and control mechanism for synchronizing the movement of the screen and the projector with the movement of the film through the projector.

It is another object of the invention to provide an apparatus including a movable screen and a directional projector, in combination with an electrically energizable means for moving the screen and the projector, and control mechanism including means for making and breaking the circuit to selectively energize the energizable means in synchronism with the film.

It is a further object of the invention to provide in combination with a projector for use with a sound motion picture film, an apparatus including a plurality of electrically energizable means connected in a circuit, which includes a selector switch operable to successively energize the energizable means, a control mechanism operable when actuated through a second circuit to operate the selector switch, the second circuit being periodically completed by means associated with the film moving through the projector whereby the energizable means are selectively energized in synchronism with the film.

A further object of the invention resides in providing in the combination described in the above paragraph, a sound circuit including a plurality of sound reproducers or speakers operated in connection with the sound strip on the film, the speakers likewise being selectively energized by a selector switch operated by the mentioned control mechanism whereby the various energizable means and the various speakers are selectively energized in synchronism with the action of the image projected from the film and with the sound produced from the sound strip thereof.

It is a further object of the invention to provide a motion picture screen comprising one or more portions having contour and depth representing one or more physical objects and another flat portion upon which is projected an image forming a continuation of one of said physical objects.

It is another object of the invention to provide a novel method of producing a plurality of successive images on a screen which images form portions of a movable figure partly concealed behind the screen.

Other objects of the invention as well as additional features thereof will be more apparent from a perusal of the following part of the specification in connection with the accompanying drawings and the appended claims.

In the drawings,

Fig. 1 is a wiring diagram of the complete system which embodies the features of my invention.

Fig. 2 is a detail of a switch means associated with the film moving through the projector included in the system, the switch means being effective to periodically make and break a circuit for actuating the control means of the invention.

Fig. 3 is a fragmentary sectional view illustrating the manner in which a number of conductors may be electrically connected to any of the contact members of the selector switch or the sequence switch respectively shown in Figs. 1 and 3.

Fig. 4 is an elevational view partly in section illustrating the manner in which electrically energizable means, such as motors, are utilized to move the directional projector of the invention.

Figs. 5, 6, 7, 8, 9, and 10 are utility views illustrating the manner in which the apparatus comprising my invention may be used to obtain illusory effects in the display of composite scenes, the apparatus comprising a movable screen and various physical appurtenances together with projected images.

Referring at first to Figs. 1 and 2, my invention in general comprises an apparatus 11 in combination with a projection apparatus 12 for projecting successive images of a standard motion picture film on a screen. The projection apparatus 12, which may be standard equipment, includes a projector 13 and a lamp housing 14. For simplicity, I will hereinafter refer to the projection apparatus as a "projector".

The apparatus 11 includes a main circuit 15, a plurality of electrically energizable means generally designated by the numeral 16, a selector switch 17 operable to selectively complete the circuit through one or more of these energizable means, control mechanism generally designated by the numeral 18, and a switch means 19, shown in detail in Fig. 2, adapted to be connected in a secondary circuit 20, shown in Fig. 1, which circuit when closed actuates the control mechanism 18, in a manner to be hereinafter described.

The electrically energizale means 16 includes in the practice of my invention various electrical devices, such as one or more motors 21, one or more incandescent lamps 22, one or more electrical bells 23, and one or more solenoids 24.

The selector switch 17 includes a plurality of stationary contacts which I have shown as eight in number. These contacts which I have designated by the consecutive letters A, B, C, D, E, F, G, H are preferably arranged in a circle as shown in the diagram in Fig. 1. The selector switch 17 includes a movable contact 25 mounted on a shaft 26 so positioned with respect to the contacts A to H that when the shaft 26 is rotated the movable contact will successively engage the contacts A to H. The movable contact 25 is provided with a collector ring 28 engageable by a brush 29. The brush 29 is connected by a conductor 30 included in the main circuit 15 to one side of a potential source 31, or, if desired, to one side of the secondary of a transformer 32, the primary of which is connected across the source 31.

Each of the electrical devices 21, 22, 23, and 24 is connected in parallel to a conductor 35, included in the main circuit 15, respectively by conductors 36, 37, 38, and 39, as shown. Connected respectively to the other side of each of these devices are conductors 40, 41, 42, and 43. Each of these conductors, 40 to 43, inclusive, is preferably provided with a plurality of branch conductors. For instance, the conductor 40 may be provided with conductors 40a, 40b, and 40c to the respective ends of which are secured plugs 45. Similarly, plugs 45 are electrically secured to the branch conductors of each of the other conductors 41, 42, and 43, as shown. These branch conductors are provided so that the respective conductors 40 to 43 inclusive may be selectively connected to any of the contacts A, B, C, D, E, F, G or H. For instance, the branch conductors 40a, 40b, and 40c of the conductor 40 may be respectively connected to the contacts A, B, and C. It will be seen that when the brush 25 engages the contact A, B, or C, the motor 21 will be energized.

Any manner of support for the contacts A to H, inclusive, and any suitable means for connecting the branch conductors to the respective contacts may be utilized. I have shown, however, in Fig. 3, one form of structure by which these functions may be accomplished. Referring to Fig. 3, I show an insulating panel 50 into which the contacts, such as the contact A, are set, as shown, so as to be engageable by the rotating movable contact 25. Secured to the back of the panel 50 is a multiple jack 51 adapted to receive a plurality of the plugs 45. The multiple jack 51 is electrically secured to the contact A in any suitable manner, such as by riveting or soldering to an extension arm which may be formed integrally with the contact A. The extension arm 52 is preferably elongated to extend beyond the edge of the panel 50 to afford means for permanently connecting certain conductors, as indicated in Fig. 3, for a purpose to be hereinafter described.

The control mechanism 18 includes the shaft 26, which shaft is supported by one or more suitable brackets 60. Secured to the shaft 26 is a gear 61 which meshes with a pinion 62, which in turn is secured to a stub-shaft 63 supported by suitable brackets 64. Mounted on the shaft 63 is a slip clutch 65, comprising a driven part 66, and a drive disc 67 which is freely rotatable on the shaft 63 in engagement with the driven part 66. Secured to the drive disc 67 is a pulley 68, constantly driven by a belt 69 extending from a pulley 70, mounted on the drive shaft of a motor 71. The drive disc 67 is constantly urged against the driven part 66 by a spring 72 surrounding the shaft 63 and confined between a pin 73, extending through the shaft 63, and a shoulder of the pulley 68, substantially in the manner shown. Provided on the driven part 66 is an annular shoulder 75, in the periphery of which is provided a notch 76 which is engageable by a plunger 77 secured to the core of a solenoid 78, indicated diagrammatically in Fig. 1. The motor 71 is constantly driven and may be connected to the potential source 31 in the manner shown.

In the operation of the control mechanism 18, the drive disc 67 is constantly driven and the driven part 66 is held against rotation by the plunger 77. It will be seen that a momentary electrical impulse energizing the solenoid 78 will withdraw the plunger 77 from the notch 76 and permit the slip clutch 65 to rotate the driven part 66. It is intended that only one rotation of the driven part 66 will occur for each energization of the solenoid 78, the momentary electrical impulse delivered to the solenoid 78 enduring only a sufficient length of time to draw the plunger 77 from the notch 76 to permit the rotation of the driven part 66 to start, the plunger 77 being forced into the notch 76, at the completion of one revolution of the driven member, by a spring 79 confined between the body of the solenoid 78 and a shoulder 80 provided on the plunger 77. Likewise, it is intended that the ratio of the gear 61 and the pinion 63 will be such that one complete revolution of the driven member 66 will advance the movable contact 25 from the intermediate position between two of the contacts of the selector switch 17 into engagement with the next succeeding contact in the direction of its travel, indicated by the arrow 82 of Fig. 1.

The momentary electrical impulse is delivered to the solenoid 78 for the actuation of the control mechanism 18 through the secondary circuit 20 which is connected to the potential source 31 through a transformer 85.

The means of the invention for periodically completing the secondary circuit 20 comprises the switch means 19, shown in Fig. 2, which includes a contractor 86, adapted to bridge a pair of contacts 87 and which is preferably connected in the circuit 20 by a plug and jack indicated at 88 in Figs. 1 and 2. The contactor 86 of the switch 19 may be mounted on an insulated bar 89 which is supported by a bracket 90 suitably secured to the housing of the projector so as to support the bar 89 in a position perpendicular to the plane of a film 91 as it travels through the projector 13 Rotatably mounted on the end of the bar 89 is a roller 92 which engages the edge 93 of the film 91, substantially in the manner shown. The bar 89 is constantly urged toward the edge 93 of the film by a spring 94 surrounding the bar 89 and confined between the bracket 90 and a pin extending through the bar or by other suitable means for accomplishing this purpose. Formed in the edge 93 of the film 91 at certain predetermined positions relative to the frames of the film are notches 95 which are of such a contour that the roller 92 momentarily drops into the notches and immediately rises again to the edge 93 as the film moves through the projector. This dropping of the roller into the notches 95 momentarily completes the secondary circuit 20 through the contacts 87 so that a momentary electrical impulse is delivered to the solenoid 78, as before described.

The parts thus far described comprise an automatic apparatus for selectively energizing one or more of the electrically energizable means, such as the motor 21, lamp 22, bells 23, and the solenoids 24, which are connected in parallel in the main circuit 15.

It should be clear that any of the described electrically energizable means may be connected with any of the contacts A to H inclusive so that these electrically energizable means may be energized in any desired sequence as the movable contact 25 of the selector switch 17 is moved to successively engage the contacts A to H. The plurality of conductors, illustrated in Figs. 1 and 3, such as the conductors 40a, 40b, and 40c, are adapted to be plugged into any of the contacts A to H of the selector switch 17, either successively or in any other sequence to energize the energizable means 21 to 24, as desired. It should also be clear that the actuation of the control mechanism 18 by the switch 19 which is directly associated with the film 91, as just described, permits the engagement between the movable contact 25 and the contacts A to H to be synchronized with the movement of the film through the projector, thus synchronizing the energization of the electrically energizable means 21 to 24 inclusive with the movement of the film through the projector.

The invention also includes a novel sound reproducing system which comprises a sound circuit 100 in which is connected, in parallel, a plurality of sound reproducers or speakers, such, for instance, as the speakers designated in Fig. 1 by the letters J, K, L, and M. The sound circuit 100 includes a conductor 101 connected as shown to one terminal connection of each of the speakers J, K, L, M. The other terminal connection of these speakers is respectively connected to conductors 102, 103, 104, and 105. Connected respectively to each of the conductors 102, 103, 104, and 105 are conductors 102a, 103a, 104a, and 105a. One or more of these conductors may be provided with branch conductors, such as the branch conductors 104b and 104c, of the conductor 104a, and such as the branch conductors 105b and 105c of the conductor 105a. These conductors and branch conductors are adapted for plug and jack connection to a sequence switch 106, similar in construction and operation to the selector switch 17 in the main circuit 15. The sequence switch 106 comprises a plurality of segments, characterized by the letters O, P, Q, R, S, and T, these segments being arcuate in form and supported in an insulating panel in relatively insulated relationship, in a manner similar to the contacts of the selector switch 17, previously described. No detailed plug and jack arrangement is shown in connection with the sequence switch 106; however, it is preferable to provide each of the segments with a multiple jack similar to the multiple jack 51 utilized, as shown in Fig. 3, in connection with the selector switch 17 so that the respective plugs 40a, 40b, and 40c, or others in addition, may be utilized to connect any of the energizable means 21 to 24 to the main circuit 15 in any desired sequence through the selector switch 17. The sequence switch 106 includes a rotary contact 107 which is secured to the shaft 26 upon which the movable contact 25 of the selector switch 17 is mounted so that these contacts move in synchronism when the shaft 26 is rotated. The rotary contact 107 is provided with a collector ring 108 engageable by a resilient brush 109. Connected to the brush 109 is a conductor 110, which together with the conductor 101 is connected to the outlet terminals of an amplifier 111, the other side of the amplifier being connected through a pair of conductors 112 to a pick-up mechanism, not shown, utilized in connection with a sound strip on the film 91, in a manner well known to the art of sound reproduction.

It will be clear that as the rotary contact 107 rotates to consecutively engage the segments of the sequence switch, the sound reproduced from the sound track of the film 91 will be delivered first through one of the speakers and then another as the rotary contact moves from one segment of the sequence switch to another. By this means, it is possible to reproduce the sound at will through any of the various speakers which may be respectively associated with the various electrically energizable means, selectively energized by the selector switch 17.

My invention also includes a manual control system whereby the operator of the projector 13 may manually actuate the control mechanism 19 to operate the various electrically energizable means 21, 22, 23, and 24 and the speakers which may be associated with certain of these devices. The parts comprising the manual control system include a manually operable switch 115 connected in the circuit 20 so that when the plug and jack 88 connecting the switch means 19 with the secondary circuit is disconnected the switch 115 may be utilized to complete the secondary circuit 20 which delivers an electrical impulse to the solenoid 78 for actuating the control means 18, in the manner described above.

In order that the operator of the projector might be aware at all times as to which of the contacts A to H of the selector switch 17 is energized, the system preferably includes a visible indicating means for this purpose.

This visible indicator means preferably comprises a plurality of pilot lamps, one for each of the contacts A to H of the selector switch, these pilot lamps being designated in Fig. 1 with the characters a to h, inclusive, to signify their respective relationship with the contacts of the selector switch 17. One terminal of each of the pilot lamps is connected to one of the contacts of the selector switch 17, by a conductor, as shown in the diagram, Fig. 1. The other terminal of each of the pilot lamps is connected, as shown, to a conductor 116 which returns to the conductor 35 of the main circuit 15, thus completing the circuit from the conductor 30 through the various contacts of the selector switch 17, the pilot lamps, and back to the secondary of the transformer 32.

It will be seen that as each of the contacts A to H of the selector switch 17 is engaged by the movable contact 25, the respective pilot light for that particular contact will be illuminated, serving to indicate to the operator which of the contacts is engaged by the movable contact 25, even though a particular contact is not connected to any of the energizable means.

The connection between the conductor leading from the pilot lamp and the contacts A to H of the selector switch, may be made either through the multiple jack 51, associated with each of these contacts, or may be a permanent connection, as indicated at 117 in Fig. 3, utilizing for this purpose the outwardly projecting end of the extension arm 52.

There is also preferably provided a manual control whereby the operator of the projector 13 may manually select the speaker through which the sound track of the film 91 is reproduced. This is accomplished by extending the conductors 102, 103, 104, and 105 and placing in each of these conductors, at a point accessible to the operator, a switch 118. Each of the switches 118 is connected to a conductor 119 which in turn is connected to the conductor 110 leading to the amplifier 111. It will be seen that when the conductors 102a to 105a are disconnected from the sequence switch 106, the sound circuit 100 may be completed through any of the speakers J, K, L, or M through one of the switches 118.

The system preferably includes a cut-out means whereby the operator may disconnect that portion of the main circuit 15 which energizes the electrically energizable means 21 to 24 inclusive. This means comprises a switch 120 interposed in the conductor 35 of the main circuit 15, the switch 120 being positioned so as to be accessible to the operator, there being a pair of conductors 121 connecting the switch 120 to the conductor 35 as shown in the diagram, Fig. 1. It will be seen that by this switch means 120 the operator may disconnect the electrically energizable means from the circuit 15 without disconnecting the portion of the circuit including the pilot lamps so that even when the switch 120 is open the pilot lamps operate to visibly indicate to the operator which of the contacts is engaged by the movable contact 25.

I will now describe various features of the apparatus which are operated by the electrically energizable means 21 to 24 inclusive to illustrate the various uses to which the apparatus thus far described may be applied.

In Fig. 5, I show a movable screen 125 suitably mounted on vertical guide rods, or wires 126. Operating means in the form of a reel or drum 127 upon which is wound a cable 128, connected to the screen 125 as indicated, is provided for moving the screen 125 vertically on the guide rods 126. One of the motors 21 may be utilized for rotating the drum 127, the motor and drum being operably connected, as indicated, by a chain or belt 129.

In Fig. 6 I show a horizontally movable motion picture screen 130, mounted for horizontal movement on suitable means, such as a track 131 engageable by rollers 132 secured to the screen 130 for the support thereof. Operating means for moving the screen 130 on the track 131 is provided and may include a cable 133 looped around a pair of pulleys 134, the opposite ends of the cable 133 being secured to opposite sides of the screen 130, in the manner indicated. One of the pulleys 134 may be mounted on the drive shaft of a motor 21, or may be otherwise suitably driven by the motor to cause the screen 130 to travel horizontally on the track 131.

The movable screens 125 and 130 of Figs. 5 and 6, and the mechanism for operating the same, are intended in practice to be utilized to increase the illusory effect of movement of an object portrayed on the screen by projection of the film 91. For instance, the screen 125, utilized in portraying a balloon ascension, may be moved vertically by energization of the motor 21 while the image of the balloon and the action of characters within the balloon is being projected from the film on the screen, thus serving to create the illusion to an audience in a theater that the balloon actually ascended from the floor of the stage and disappeared behind the upper scene of the stage.

Likewise, by the use of the horizontally movable screen 130 an object such as a train, automobile, airplane, or the like may be made to appear to move across a stage and disappear behind the wings thereof. The illusory effect of portraying such scenes is enhanced by fading out certain portions of the image projected as the movable screen disappears from the view of the audience behind the scenery.

The invention includes in combination with the movable screen and the apparatus above described for operating the screen in synchronism with the movement of the film 91 through the projector, operating means for moving the projector 13 to follow the movement of the movable screen.

This means for directionally moving the projector 13 comprises in general a table 140 upon which the projector and lamp housing 14 are mounted, the table 140 being supported upon a base 141 by a universal mechanism 142. The universal mechanism 142 comprises a lower part 143 pivoted to the base 141 as by a pin 144, so as to swing horizontally, and an upper part 145 pivoted between a pair of upwardly extending wings 146 of the lower part 143 as by a pin 147, so as to swing vertically. For operating the mechanism 142 to swing the projector in any desired direction I provide an operating means including a semi-circular rack 148 formed on the upper part 145, and a worm gear 149 which meshes with the rack 148, the worm gear 149 being mounted on a rotatable shaft 150 journalled in bearings 151 supported by the lower part 143. It will be seen that a rotation of the worm gear 149 by the shaft 150 will serve to swing the projector 13 vertically about the pin 147 an as axis. Formed on the lower part 143 is a circular rack 152 having teeth meshing with a pinion 153 mounted on a shaft 154 suitably journalled, as at 155, on the base 141. It will be clear that a rotation of the pinion 153 by the shaft 154 will serve to swing the projector 13 in a horizontal plane about the vertical pin 144 of the lower part as an axis. Thus when the plugs 45 are connected into the jacks 51 in a desired sequence, the motors 21 may be caused to move the projector universally to cause the image projected thereby to follow the movement of a movable screen.

My invention contemplates both manual and automatic means for rotating the shafts 150 and 154 to move the projector 13. In Fig. 4 I have shown a motor and a gear box 156 mounted on the lower part 143 and associated with the shaft 150 for driving the same. A motor and a gear box 156 are likewise mounted on the base 141, and associated with the shaft 154 for driving this shaft. Each of these motors may be one of the energizable means described in connection with the wiring diagram, Fig. 1, and each is provided with one or more of the plugs 45 for connection to the jack 51 of any of the various contacts A to H of the selector switch 17.

It will be seen that by this arrangement the projector 13 may be moved automatically in any desired direction in synchronism with the action protrayed by the projected image of the film 91. This is accomplished by connecting any of the plurality of plugs 45 of either or both of the projector moving motors 21 into any of the contacts A to H of the selector switch 17, and providing suitable notches 95 in the film 91 to deliver an electrical impulse through the secondary circuit 20 to actuate the control mechanism 18 for operating the selector switch to energize either or both of these motors 21 at a predetermined time and for a predetermined duration of operation.

In the diagram, Fig. 1, I have indicated manually controlled operating means for rotating the shafts 150 and 154 which means comprises a crank or hand wheel 157 formed on each of the shafts. In utilizing this manual control, the operator may by watching the movement of the screen, such as either the screen 130 or 125, so manipulate one or both of the cranks 157 that the projector 13 will be swung to follow the movement of the screen, or move an image in various directions.

In Fig. 7 I show somewhat diagrammatically a stage setting which for purposes of description I will term a screen 160 which includes a flat portion 161, which comprises the back drop of the setting and upon which a projected image may be projected; there being other portions of the screen having depth and contour, such, for instance, as a stand 162 having a lamp 163 thereon, a picture 165 hanging on the back drop representing a wall, and a door 166 cut in this back drop. By utilizing a screen of this character, a scene may be portrayed which comprises composite action of a projected figure and the various physical objects just described. For instance, a projected image may be made to appear to enter the door 166, kick the stand 162 so that the lamp and stand crash to the floor, and perhaps shoot the picture 165 from the wall. The movement of physical objects, such as opening and closing of the door, the crash of the stand and lamp and the picture as just described, in synchronism with the action of the projected image, is accomplished by the use of my apparatus. The door 166 may be opened and closed by one or more of the solenoids 24 described in connection with the wiring diagram, Fig. 1. Likewise, the movement of the stand may be accomplished by one of the solenoids 24 attached by a wire to the stand. So also, a peg upon which the picture 165 is hung upon the wall may be removed to cause the picture to fall by action of one of the solenoids 24.

The invention likewise contemplates a form of screen having one or more portions having contour and depth representing one or more physical objects, such as the body portion 170 of a dummy figure 171, shown diagrammatically in Fig. 8; and having another more or less flat portion 172 upon which may be projected an image of a movable portion of the physical object, such as the face of the figure 171. Various means for providing motion to the dummy figure 171 in synchronism with movement of the film 91 may be arranged; for instance, a truck 173 upon which the dummy figure is mounted may be driven by one of the motors 21, and one or both of the arms of the dummy figure may be caused to move by hinges (not shown) located in the shoulder or elbow 174 of the arms which hinges are operated by one or more of the solenoids 24.

Fig. 9 illustrates the manner in which a novel method is utilized to display a composite figure comprising physical portions and projected images. In this connection, a small portable screen 180 is supported by a person in any suitable manner such as by straps across the shoulders so that various portions of the person's anatomy, such as the head 181, the arms 182, and the feet 183 are visible as indicated in the drawing. In this arrangement the portion of the person's figure hidden behind the screen 180 is projected upon the screen. The directional mechanism for moving the projector 13 is utilized, as above described, to follow the movement of the screen 180 carried by the figure. The display of such a composite figure is accomplished by my novel method, which comprises the steps of, first, exposing a negative film to obtain a succession of negative images of the figure on a film; second, matting out portions of the images of the figure corresponding to those portions of the figure not intended to be concealed behind the screen; third, making a positive film from the matted negative; and, fourth, projecting an image of the positive film on the screen partly concealing a like figure.

Various other uses of my apparatus to assist in creating an illusion of movement of objects portrayed by a projected image on a screen include, suitable mechanism for moving the chairs upon which the audience is seated in synchronism with the action portrayed on the screen. Fig. 10 indicates diagrammatically the manner in which a chair, or series of chairs 185 may be associated with, for instance, a hydraulic piston 186 having an electrically operable control valve 189 which may be connected in the main circuit 15 in the same manner as the previously described electrically operated means 21 to 24, and which is provided with one or more of the plugs 45 adapted for connection with the multiple jacks 51 of the selector switch 17.

It should be clear that the screen operating means or the projector operating means utilized to produce any of the effects discussed in connection with Figs. 5 to 10, inclusive, may be selectively energized in synchronism with the action portrayed by the projected image of the film 91. Likewise, certain of the sound reproducers J, K, L, or M, which might be associated with certain of the arrangements disclosed in Figs. 5 to 10 may be selectively energized at will.

I have disclosed the mechanism comprising various parts of my apparatus in simple diagrammatic form in connection with the wiring diagram, Fig. 1. It should be understood, however, that I do not intend the invention to be limited to these specific mechanical arrangements shown and mentioned in the specification. It should be remembered that the true scope of the invention should be interpreted by the appended claims.

I claim as my invention:

1. In combination with a projector for use with a moving picture film: mechanism supporting said projector for universal pivotal movement; a movable screen; mechanism for moving said screen in synchronism with said moving picture film; and operating means for moving said projector to follow the said movable screen.

2. In combination with a projector for use with a moving picture film: a support for said projector including means for universally pivoting said projector on two axes perpendicular to each other; separate operating means for pivoting said projector on each of said axes; a movable screen; screen-operating means for moving said screen; and control mechanism in synchronism with said film for automatically actuating said screen-operating means and selectively actuating said projector operating means whereby the projected beam from said projector follows said movable screen.

3. In combination with a projector for use with a moving picture film: mechanism supporting said projector for universal pivotal movement; a movable screen; screen-operating means for moving said screen; a main electric circuit for actuating said screen-operating means; control mechanism for closing and opening said main circuit; a secondary circuit; means associated with said film for closing said secondary circuit to actuate said control mechanism; and projector operating means for moving said projector to cause the projected beam to follow the movement of said screen.

4. In combination with a projector for use with a moving picture film: a support for said projector including means for universally pivoting said projector on two axes perpendicular to each other; separate operating means for pivoting said projector on each of said axes; a movable screen; screen-operating means for moving said screen; a main electric circuit; a selector switch in said circuit for selectively actuating said screen-operating means and either or both of said projector operating means whereby the projected beam from said projector is automatically caused to follow the movement of said screen; control mechanism for closing and opening said selector switch; and a secondary circuit including means associated with said film for closing said secondary circuit to actuate said control mechanism.

5. In combination with a projector for use with a moving picture film: a support for said projector including means for universally pivoting said projector on two axes perpendicular to each other; separate operating means for pivoting said projector on each of said axes; a movable screen comprising portions having contour and depth representing physical objects and another flat portion upon which is projected an image of movable portions of said physical objects; screen-operating means for moving said screen; and control mechanism in synchronism with said film for automatically actuating said screen-operating means and selectively actuating said projector operating means whereby the projected beam from said projector follows said movable screen.

6. In combination with a projector for use with a moving picture film: mechanism supporting said projector for universal pivotal movement; a movable screen comprising portions having contour and depth representing physical objects and another flat portion upon which is projected an image forming a continuation of one of said physical objects; screen-operating means for moving said screen; a main electric circuit for actuating said screen-operating means; control mechanism for closing and opening said main circuit; a secondary circuit; means associated with said film for closing said secondary circuit to actuate said control mechanism; and projector operating means for moving said projector to cause the projected beam to follow the movement of said screen.

7. In combination with a projector for use with a moving picture film: mechanism supporting said projector for universal pivotal movement; projector-operating means for moving said projector; a movable screen; screen-operating means for moving said screen; and control mechanism operable in synchronism with said film for automatically actuating said screen-operating means and projector-operating means whereby the projected beam from said projector follows said movable screen.

8. In combination with a projector for use with a moving picture film: mechanism for movably supporting said projector; a movable screen; mechanism operable in synchronism with the scene portrayed by said film for moving said screen; and operating means for automatically moving said projector to project said film on said moving screen.

9. In combination with a projector for use with a moving picture film: mechanism for movably supporting said projector; a movable screen; sound reproducing means associated with said movable screen and operable in connection with a sound strip on said film; mechanism operable in synchronism with the scene portrayed by said film for moving said screen; and operating means for automatically moving said projector to project said film on said moving screen.

10. In combination with a projector for use with a moving picture film: mechanism supporting said projector for universal pivotal movement; a movable screen; sound reproducing means associated with said movable screen and operable in connection with a sound strip on said film; mechanism for moving said screen in synchronism with said movable film; and operating means for moving said projector to follow the said movable screen.

VINCENT C. DE YBARRONDO.